(12) United States Patent
Kerr et al.

(10) Patent No.: US 7,071,483 B2
(45) Date of Patent: Jul. 4, 2006

(54) METHOD AND SYSTEM FOR A MULTI-AXIS SCANNING MODULE

(75) Inventors: Roger S. Kerr, Brockport, NY (US); Seung-Ho Baek, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 239 days.

(21) Appl. No.: 10/749,824

(22) Filed: Dec. 31, 2003

(65) Prior Publication Data

US 2005/0139794 A1 Jun. 30, 2005

(51) Int. Cl.
G03B 42/08 (2006.01)

(52) U.S. Cl. .................... 250/586; 250/585

(58) Field of Classification Search ........ 250/586, 250/585, 591, 584
See application file for complete search history.

(56) References Cited

U.S. PATENT DOCUMENTS

| | | | |
|---|---|---|---|
| 4,346,295 A | 8/1982 | Tanaka et al. | |
| RE31,847 E | 3/1985 | Luckey | |
| 4,742,225 A * | 5/1988 | Chan | 250/586 |
| 4,743,759 A * | 5/1988 | Boutet | 250/586 |
| 4,816,679 A * | 3/1989 | Sunagawa et al. | 250/585 |
| 5,506,417 A * | 4/1996 | Brandt | 250/586 |
| 5,598,008 A * | 1/1997 | Livoni | 250/586 |
| 6,180,955 B1 * | 1/2001 | Doggett et al. | 250/586 |
| 6,373,074 B1 * | 4/2002 | Mueller et al. | 250/584 |
| 6,987,280 B1 * | 1/2006 | Boutet et al. | 250/586 |

* cited by examiner

*Primary Examiner*—Albert Gagliardi
(74) *Attorney, Agent, or Firm*—BuskopLawGroup,P.C.

(57) ABSTRACT

A multi-axis scanning module (20) for direct light to and collecting light from a photo-stimulatable radiographic media (28) comprises a housing (10) having a ellipsoid chamber (25) moveable on a first axis (61) relative to a radiographic media. A laser (18) is disposed in a channel (12) to generate a laser beam (19) of stimulating electro-magnetic radiation through the channel and out of a first opening (14) in the housing to stimulate an area of the radiographic media. A filter (32) for passing only emitted light (34) from the area, wherein the filter is disposed between the ellipsoid chamber and a second opening (16). A light detector (30) disposes adjacent the filter in the second opening. The multi-axis scanning module is adapted to move transitionally on the first axis while the laser is dithered on a second axis relative to the first axis to enable swath scanning of the radiographic media and production of an electronic signal.

34 Claims, 3 Drawing Sheets

METHOD AND SYSTEM FOR A MULTI-AXIS SCANNING MODULE

CROSS REFERENCE TO RELATED APPLICATIONS

Reference is made to commonly-assigned copending U.S. patent application Ser. No. 10/719,630, filed Nov. 21, 2003, entitled INTEGRATED SCAN MODULE FOR A COMPUTER RADIOGRAPHY INPUT SCANNING SYSTEM, by Baek et al., the disclosure of which is incorporated herein.

FIELD OF THE INVENTION

The present invention relates in general to radiography and in particular to scanning a computer radiographic phosphor plate having a latent image to generate a digital image file by means of a scanning device having a minor sub scanning axis to allow swath scanning using a single light source.

BACKGROUND OF THE INVENTION

In a photo-stimulatable phosphor imaging system, as described in U.S. Pat. No. RE 31,847, a photo-stimulatable phosphor sheet is exposed to an image wise pattern of short wavelength radiation, such as x-radiation, to record a latent image pattern in the photo-stimulatable phosphor sheet. The latent image is read out by stimulating the phosphor with a relatively long wavelength stimulating radiation such as red or infrared light. Upon stimulation, the photo-stimulatable phosphor releases emitted radiation of an intermediate wavelength such as blue or violet light in proportion to the quantity of short wavelength radiation that was received. To produce a signal useful in electronic image processing, the photo-stimulatable phosphor sheet is scanned in a raster pattern by a beam of light produced for example by a laser deflected by an oscillating or rotating scanning mirror and the emitted radiation is sensed by a photo-detector such as a photomultiplier tube to produce the electronic image signal.

In one type of scanning apparatus, the photo-stimulatable phosphor sheet is placed on a translation stage and is translated in a page scan direction past a laser beam that is repeatedly deflected in a line scan direction to form the scanning raster.

To optimize the signal-to-noise ratio (S/N) of the imaging system, it is desirable to collect as much of the emitted light as possible and to direct it to the photo-detector. While the apparatus employed to collect the light may take various forms, one form of light collector is proposed in U.S. Pat. No. 4,346,295. The light collector proposed by U.S. Pat. No. 4,346,295 comprises a sheet of light transmitting material that is flat on one end, and rolled into an annular shape on the opposite end. The flat end of the light collector is positioned adjacent the scan line on the photo-stimulatable phosphor sheet. The light receiving face of a photomultiplier tube is placed against the annular end of the light collector. Light emitted from the phosphor sheet enters the flat end of the light collector and is light piped to the photomultiplier tube. Improved light collection efficiencies are achieved by having two such light collectors, one on each side of the scan line, or by placing a long narrow reflector opposite the flat end of the light collector to increase the collection window of the light collector. The transparent light collector has the drawback that it is inherently complicated to manufacture. Furthermore, the collection efficiency of transparent light guides is limited due to their absorption in the wavelength range of light emitted by the photo-stimulatable phosphor sheet (e.g. blue-violet).

Experiments have identified another factor that limits the signal-to-noise ratio achievable with the photo-stimulatable phosphor imaging apparatus. As the stimulating radiation beam scans the photo-stimulatable phosphor sheet, a high percentage (up to 90%) of the stimulating radiation is reflected from the photo-stimulatable phosphor. If this reflected stimulating radiation is further reflected back on to the surface of the photo-stimulatable phosphor (it is then called "flare") in a location away from the instantaneous scanning point, the phosphor will be stimulated to emit in these other locations. When this flare induced emission of light is collected by the light collector it is called pre-stimulation and results in a spurious background signal. Such reflection of the stimulating radiation onto the photo-stimulatable phosphor may occur from the light collecting edge of the light guide described above. Examples of the image degradation caused by pre-stimulation include a reduction in the contrast of images due to flare induced emission from high exposure areas. This adds unwanted signal to low exposure areas. Shadow artifacts are produced in the image when a high exposure object on a low exposure background field is scanned. The signal-to-noise ratio in all image areas is degraded. Laser noise is enhanced since a large area of the phosphor is exposed to a low level of stimulating radiation, the light emitted from this area will follow the fluctuations in laser power, thereby amplifying the effect of the laser noise.

It is therefore the object of the present invention to provide a light collector having improved collection efficiency and one that is easy to manufacture.

SUMMARY OF THE INVENTION

Briefly, according to one aspect of the present invention a multi-axis scanning module for emitting light to and collecting light from a photo-stimulatable radiographic media comprises a housing moveable on a first axis relative to a radiographic media. A laser is disposed in a channel to generate a beam of stimulating electromagnetic radiation through the channel and out of the first opening to stimulate an area on the radiographic media. A filter passes only light emitted from the area, wherein the filter is disposed between a center chamber and a second opening. A light detector disposes adjacent the filter in the second opening. The multi-axis scanning module is adapted to move transitionally on the first axis while the laser is modulated on a second axis relative to the first axis to enable swath scanning of the radiographic media and production of an electronic signal.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with accompanying drawings.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
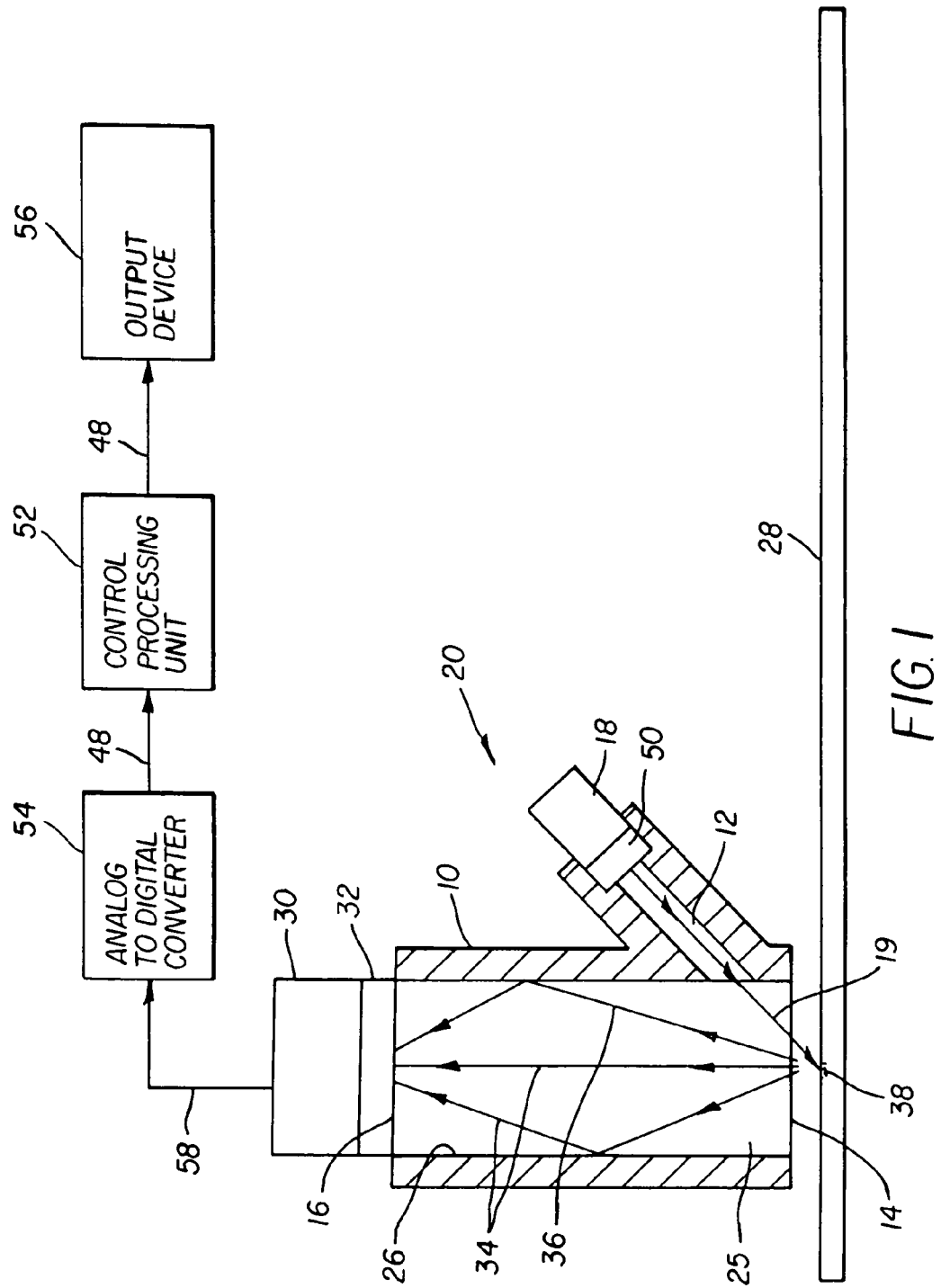
FIG. 1 shows a schematic side view of a scanning module.
Figure 2:
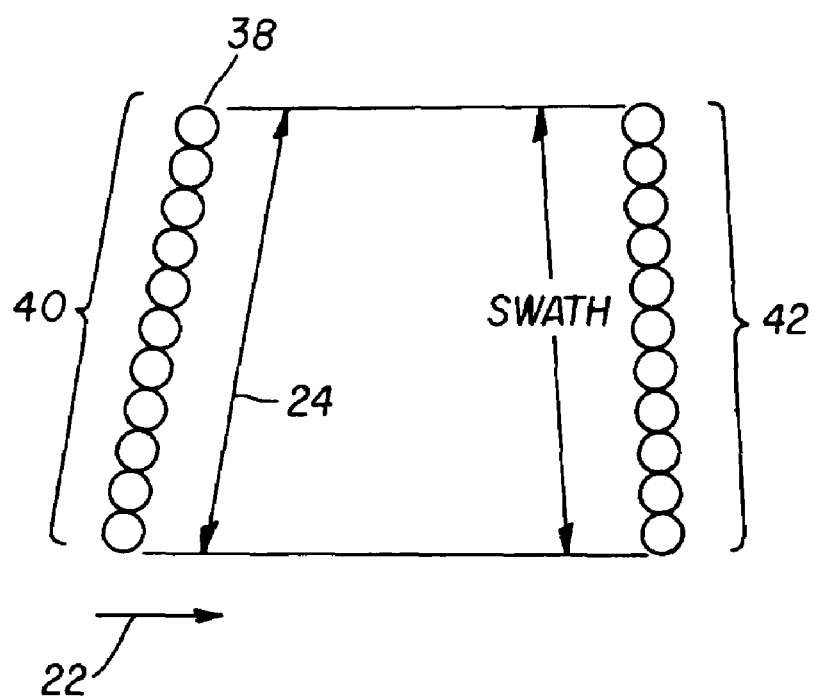
FIG. 2 shows a schematic plan view of the multi-axis media scan

Referring to FIG. 1 a multi-axis scanning module 20 for providing electromagnetic radiation to and collecting emitted light 34 and reflected light 36 wherein the collection efficiency of the multi-axis scanning module 20 is approximately 52% from a photo-stimulatable radiographic media 28 such as selected from the group, a radiographic screen, a radiographic plate, a radiographic sheet, and or combinations thereof. The multi-axis scanning module 20 is adapted to move transitionally on a first axis 22 while a laser 18 emits a laser beam 19 of light and is dithered between 1 millimeter and 3 millimeters, preferably 1.5 millimeters, at an approximate rate 16 k Hertz using a device such as a gavel mirror or a piezo transducer on a second axis 24 relative to the first axis 22 to enable swath 40 to scan the radiographic media 28 as shown in FIG. 2, as the swath 40 is scanned at an angle of approximately six degrees relative to the first axis a motion corrected swath 42 is generated.

The a multi-axis scanning module 20 of FIG. 1 comprises a housing 10 composed of materials such as plastic, a polycarbonate, a composite, a metal material or combinations thereof preferably of a molded construction, but is not limited to, and is moveable on a first axis 22 relative to the radiographic media 28 wherein the housing 10 comprises an ellipsoid chamber 25 having a reflective surface 26 that can be mirror coated reflective surface 26 with a reflectivity range of 80% to 95% with diameter of 15 mm to 23 mm, preferably 20 mm, and a length that creates as an ellipsoid with a surface that matches the following formula:

$$(x2/9.64372)+(y2/9.64372)+((z-11)2/172)=1$$

A channel 12 transmits a laser beam 19 that is in communication with the ellipsoid chamber 25 and wherein the laser 18 is preferably a Hitachi single mode 635 nm, 35 mw laser or a multi mode 635 nm, 100 mw laser. A first opening 14 communicates with the ellipsoid chamber 25 adapted for permitting the electromagnetic radiation to pass out of the ellipsoid chamber 25 and the emitted light 34 and the reflected light 36 to be gathered in the ellipsoid chamber 25. A second opening 16 communicates with the ellipsoid chamber 25. The laser 18 is disposed in the channel 12 to generate the laser beam 19 of electromagnetic radiation through the channel 12 and out the first opening 14 to generate a stimulated area 38 on the radiographic media 28, wherein the ellipsoid chamber 25 is adapted to receive emitted light 34 and reflected light 36 from the stimulated area 38 on the radiographic media 28. A filter 32, preferably blue, which may have an antireflective coating on at least one surface is disposed between the ellipsoid chamber 25 and the second opening 16. The filter 32 may be a Hoya 390 or B 410 from Hoya of Tokyo, Japan or alternatively a Schott BG −1 or BG 3 filter available from Schott of Mainz, Germany and is used to selectively pass only the emitted light 34 from the stimulated area 38 on the radiographic image 28 to a light detector 30 disposed adjacent the filter 32 in the second opening 16 for detecting the emitted light 34. The light detector 30, such as a PMT photomultiplier by Hamamatsu type R7400U available from Hamamatsu of Japan, receives the emitted light 34 and generates a signal 58. The signal 58 is transmitted to an analog to digital converter 54 to provide a digital signal 48. The digital signal 48 is then compiled and stored as a digital image in a control-processing unit 52, such as a computer. The digital image can then be processed depending on the needs of the user. For example, the digital image can be printed on an output device 56 such as a black and white x-ray film using a film writer or a soft display on a monitor. An example of a usable film writer in the system of the invention is a Kodak Drive U Imager 850 available from Eastman Kodak Company of Rochester, N.Y.

Figure 3:
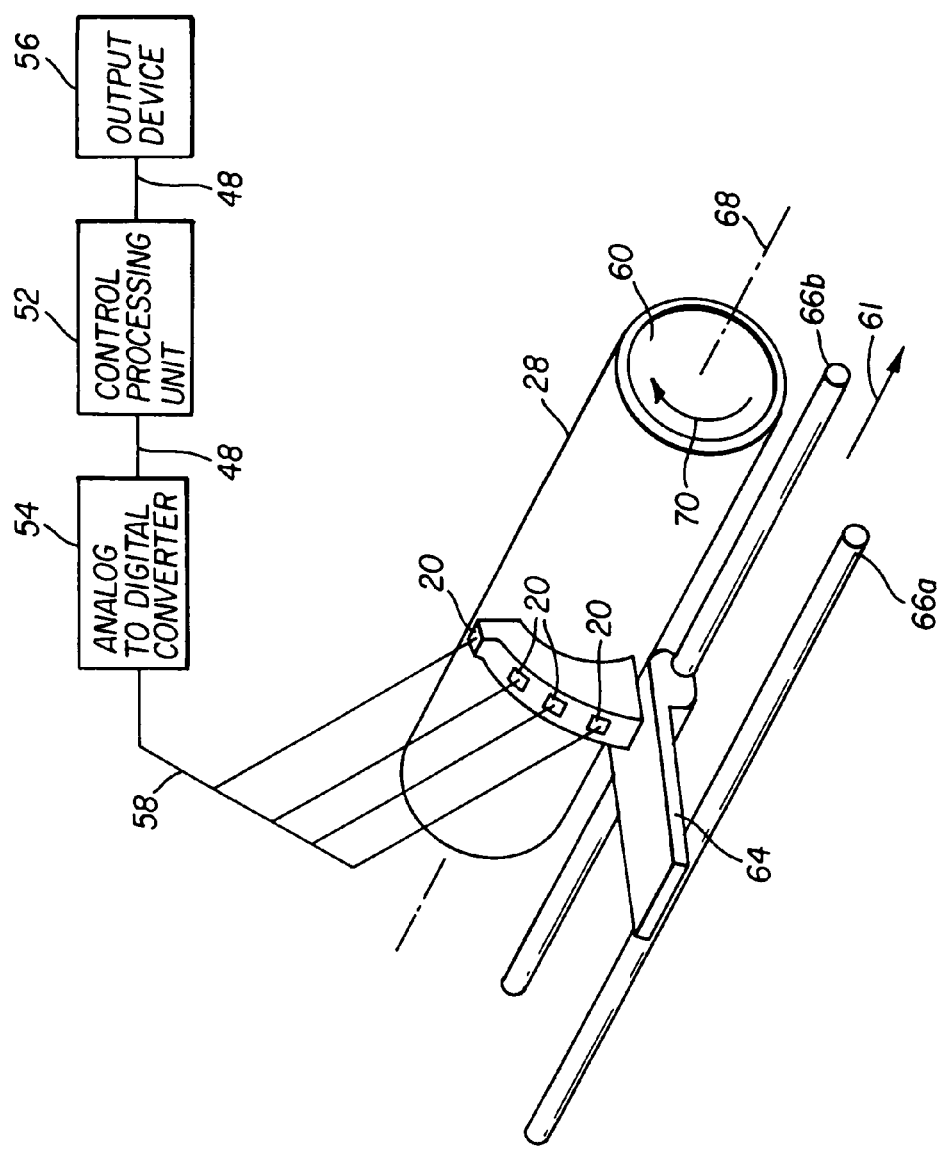
FIG. 3 shows a perspective view of the multi-axis scanning module with radiographic media externally mounted adjacent a drum.

FIG. 3 shows a multi-axis system scans radiographic media using a multi-axis swath scanning technique comprising at least one multi-axis scanning module 20 mounted on a translation stage 64 adapted for movement along axis 61 supported by translation rods 66a and 66b adjacent the radiographic media 28 mounted on a rotating drum 60 adapted for rotation about central axis 68 in a counter clockwise direction 70. As shown in FIG. 1 the multi-axis scanning module 20 comprises a housing 10 moveable on a first axis relative to the radiographic media 28 wherein the housing 10 comprises an ellipsoid reflective chamber 25; a channel 12 for transmitting a laser beam 19 in communication with the ellipsoid reflective chamber 25; a first opening 14 in communication with the ellipsoid reflective chamber 25 adapted for permitting light to pass out of the ellipsoid reflective chamber 25 and light to be gathered in the ellipsoid reflective chamber 25; and a second opening 16 in communication with the ellipsoid reflective chamber 25. The laser 18 is disposed in the channel 12 to generate a laser beam 19 of stimulating electromagnetic radiation through a collimator lens 50 that can be dithered and through the channel 12 and out the first opening 14 to generate a stimulated area 38 on the radiographic media 28. A filter 32 passes only emitted light 34 from the stimulated area 38, wherein the filter 32 is disposed between the ellipsoid reflective chamber 25 and the second opening 16. A light detector 30 disposed adjacent the filter 32 in the second opening 16 detects the emitted light 34. The multi-axis scanning module 20 is adapted to move transitionally on the first axis 22 while the laser 18 or the laser beam 19 is dithered on a second axis 24 relative to the first axis 22 to enable swath scanning of the radiographic media 28 and production of a signal 58. An analog to digital converter 54 communicates with the light detector 30 and the control processing unit 52 communicates with the analog to digital converter 54 for receiving, storing, and processing the digital signal 48. An output device 56 outputs the digital signal 48.

The invention has been de scribed in detail with particular reference to certain preferred embodiments thereof, but it will be understood that variations and modifications can be effected within the scope of the invention.

PARTS LIST 10 housing
12 channel
14 first opening
16 second opening
18 laser
19 laser beam 20 multi-axis scanning module
22 first axis
24 second axis
25 ellipsoid chamber
26 reflective surface
28 radiographic media
30 light detector
32 filter
34 emitted light
36 reflected light
38 stimulated area
40 swath
42 motion corrected swath
48 digital signal
50 collimator lens
52 control processing unit
54 analog to digital converter
56 output device
58 signal
60 rotating drum
61 axis
64 translation stage
66a translation rod
66b translation rod
68 central axis
70 clockwise direction

What is claimed is:

1. A multi-axis scanning module for providing electromagnetic radiation to and collecting emitted light and reflected light from a photo-stimulatable radiographic media, comprising:
   a) a housing moveable on a first axis relative to the radiographic media wherein the housing comprises:
      i) a reflective chamber;
      ii) a channel for transmitting a laser beam in communication with the reflective chamber;
      iii) a first opening in communication with the reflective chamber adapted for permitting the electromagnetic radiation to pass out of the chamber and the emitted light and the reflected light to be gathered in the chamber; and
      iv) a second opening in communication with the reflective chamber;
   b) a laser disposed in the channel to generate the beam of electromagnetic radiation through the channel and out the first opening to stimulate an area on the radiographic media, wherein the reflective chamber is adapted to receive (a) light emitted from the stimulated area on the radiographic media and (b) reflected light from the stimulated area;
   c) a filter for passing only light emitted from the area, wherein the filter is disposed between the reflective chamber and the second opening;
   d) a light detector disposed adjacent the filter in the second opening for detecting the emitted light; and
   e) wherein the multi-axis scanning module is adapted to move transitionally on the first axis while the laser is dithered on a second axis relative to the first axis to enable swath scanning of the radiographic media.

2. The scanning module of claim 1 wherein the reflective chamber is ellipsoidal.

3. The scanning module of claim 1 wherein the laser is modulated.

4. The scanning module of claim 1 wherein the dither rate of the first axis is 16 k Hertz.

5. The scanning module of claim 1 wherein the reflective chamber comprises a mirrored coating.

6. The scanning module of claim 5 wherein the mirrored coating provides a reflectivity range of 80% to 95%.

7. The scanning module of claim 1 wherein the radiographic media is a phosphor sheet.

8. The scanning module of claim 1 wherein the laser is a multimode laser, 635 nanometer, 100 mW, or a single mode 635 nanometer, 100 mW laser.

9. The scanning module of claim 1 wherein the filter is blue.

10. The scanning module of claim 9 wherein the filter has an antireflective coating disposed on at least one surface.

11. The scanning module of claim 1 wherein the housing comprises a plastic, a polycarbonate, a composite, a metal material or combinations thereof.

12. The scanning module of claim 1 wherein the housing has a molded construction.

13. The module of claim 1 wherein the dithering in the second axis is between 1 millimeter and 3 millimeters.

14. The module of claim 1 wherein the dithering in the second axis is 1.5 millimeters.

15. The module of claim 1 wherein the laser is dithered using a gavel mirror or a piezo transducer.

16. The module of claim 1 wherein radiographic media is selected from the group, a radiographic screen, a radiographic plate, a radiographic sheet, and combinations thereof.

17. The module of claim 1 wherein the collection efficiency of light by the module is approximately 52%.

18. A multi-axis system for scanning radiographic media using a multi-axis swath scanning technique comprising:
   a) at least one multi-axis scanning module comprising:
      i) a housing moveable on a first axis relative to the radiographic media wherein the housing comprises:
         1) an ellipsoid reflective chamber;
         2) a channel for transmitting a laser beam in communication with the ellipsoid reflective chamber;
         3) a first opening in communication with the ellipsoid reflective chamber adapted for permitting light to pass out of the chamber and light to be gathered in the chamber; and
         4) a second opening in communication with the ellipsoid reflective chamber;
      ii) a laser, disposed in the channel to generate a beam of stimulating electromagnetic radiation through the channel and out the first opening to stimulate a area on the radiographic media;
      iii) a filter for passing only light emitted from the area, wherein the filter is disposed between the chamber and the second opening;
      iv) a light detector disposed adjacent the filter in the second opening for detecting the emitted light; and
      v) wherein the multi-axis scanning module is adapted to move transitionally on the first axis while the laser is dithered on a second axis relative to the first axis to enable swath scanning of the radiographic media and production of an electronic signal;
   b) an analog to digital converter in communication with the light detector;
   c) a control processing unit in communication with the analog to digital converter for receiving, storing, and processing the digital signal; and
   d) an output device for outputting the digital signal.

19. The system of claim 18 wherein the output device is a film writer, a printer, or a soft display.

20. The system of claim 18 wherein the dither rate of the first axis is 16 k Hertz.

21. The system of claim 18 wherein the reflective chamber comprises a mirrored coating.

22. The system of claim 21 wherein the mirrored coating provides a reflectivity with a range of 80% to 95%.

23. The system of claim 18 wherein the radiographic media is a phosphor sheet.

24. The system of claim 18 wherein the laser is a multimode laser, 635 nanometer, 100 mw, or a single mode 635 nanometer, 100 mw laser.

25. The system of claim 18 wherein the filter is blue.

26. The system of claim 18 wherein the filter has an antireflective coating disposed on at least one surface.

27. The system of claim 18 wherein the housing comprises a plastic, a polycarbonate, a composite, a metal material or combinations thereof.

28. The system of claim 18 wherein the housing has a molded construction.

29. The system of claim 18 wherein the dithering in the second axis is between 1 millimeter and 3 millimeters.

30. The system of claim 18 wherein the dithering in the second axis is 1.5 millimeters.

31. The system of claim 18 wherein the laser is dithered using a gavel mirror or a piezo transducer.

32. The system of claim 18 wherein radiographic media is selected from the group, a radiographic screen, a radiographic plate, a radiographic sheet, and combinations thereof.

33. The system of claim 18 wherein the collection efficiency of light by the module is approximately 52%.

34. The system of claim 18 further comprising between 2 and 8 scanning modules for swath scanning multiple images simultaneously.

* * * * *